(No Model.)
F. N. GARDNER.
DRILL CHUCK.
No. 463,331. Patented Nov. 17, 1891.
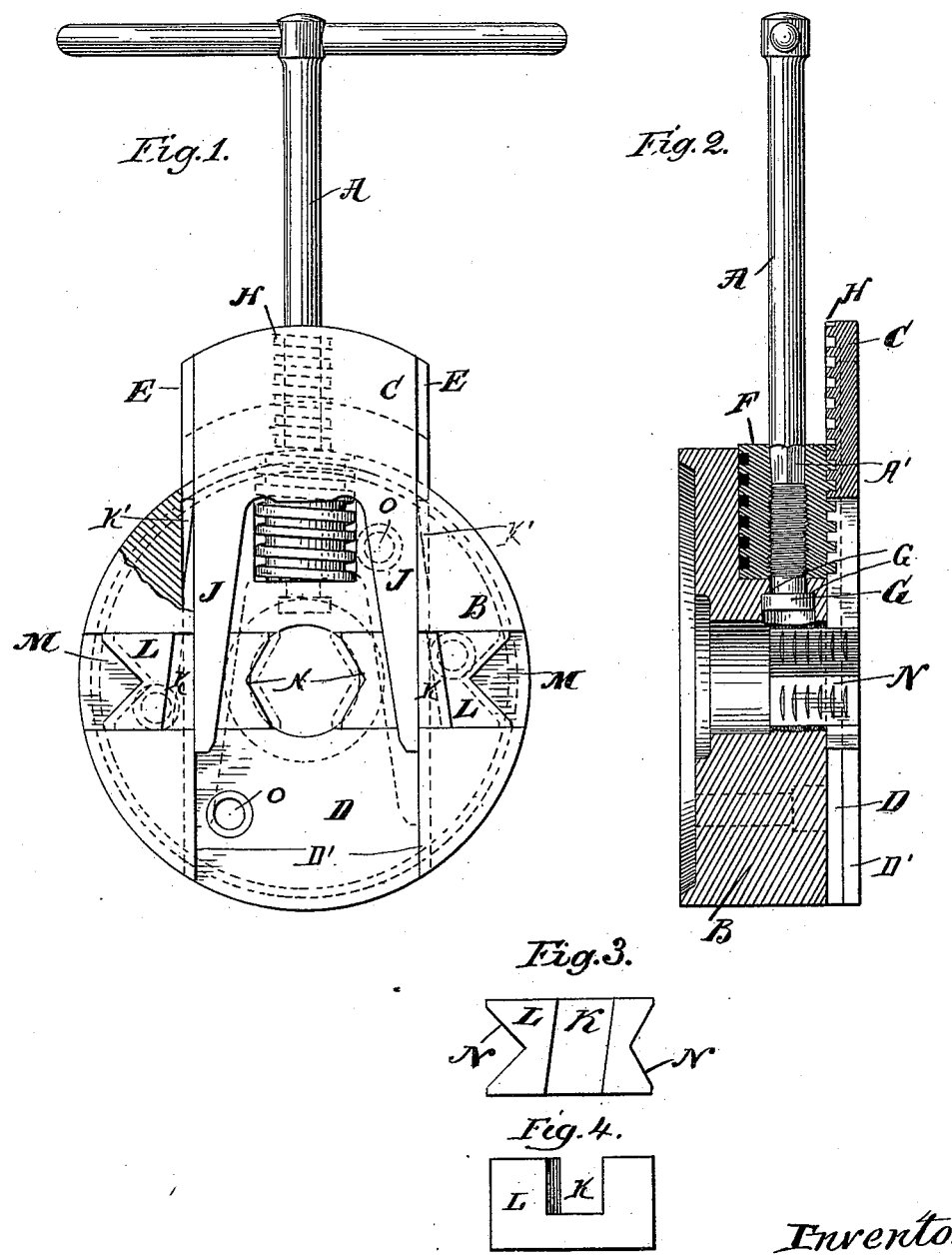
Witnesses
P. Chapman
Davida J. Johnson
Inventor
Frederick N. Gardner
By his Attorney

UNITED STATES PATENT OFFICE.

FREDERICK N. GARDNER, OF BELOIT, WISCONSIN, ASSIGNOR TO CHARLES H. BESLY, OF CHICAGO, ILLINOIS.

DRILL-CHUCK.

SPECIFICATION forming part of Letters Patent No. 463,331, dated November 17, 1891.

Application filed June 15, 1891. Serial No. 396,266. (No model.)

*To all whom it may concern:*

Be it known that I, FREDERICK N. GARDNER, a citizen of the United States, and a resident of Beloit, in the county of Rock and State of Wisconsin, have invented a certain new and useful Improvement in Chucks, of which the following is a full, clear, and exact specification.

My invention relates to chucks, and particularly such as are adapted for use either with a lathe or drill or the like, and has for its object to provide a cheap and simple chuck capable of gripping bodies of cylindrical or other form with sufficient strength to serve the purpose of such a chuck. It is illustrated in the accompanying drawings, wherein—

Figure 1 is a plan view of the chuck, the parts being shown in different positions in dotted lines. Fig. 2 is a cross-section. Fig. 3 is a plan view of one of the jaws. Fig. 4 is an elevation of one of the jaws.

Like parts are indicated by the same letters in all the figures.

A is a handle provided with the square end A'.

B is a body provided across its face with a broad groove D and the overhanging ledges D' D', and C is a slide provided with the side flanges E E, adapted to slide beneath the ledges D' D', and provided also with the one-half or quarter-thread H on its under side near its upper edge. This slide has at its lower extremity two legs J J, whose inner surfaces are inclined as indicated.

The flanges E E are cut away at K' K', so as to present an inclined surface parallel to the inner surface of such legs J J.

L L are slides provided each with the oppositely-faced jaws N N and with the transverse slot K. This slot is provided with inclined sides parallel to the inclined surfaces of the legs J J, and the slide is adapted to move back and forth in the groove M, which is substantially at right angles to the groove D.

G is a screw provided with a large head resting upon the shoulders G' G' and screw-threaded into the screw F, so as to rotate therewith and retain the screw F continuously in the same position with reference to the body B.

O O are screws or screw-bolts whereby the chuck may be secured to a suitable face-plate. The jaws N N may of course be varied, so that by substituting slides L the chuck may be adapted for various kinds of work.

The various features herein shown may be considerably altered without departing from the spirit of my invention, and I do not wish to be limited to the exact features shown.

When the chuck is to be prepared for use for any kind of work, a suitable pair of jaws is selected and the slide C is withdrawn until its lower ends are free from the slots M M. These jaws are then placed in their respective slots and the slide C brought forward until the legs J J engage the slots K K. Then by the movement of the slide C in either direction the slides L L will be correspondingly reciprocated to or from each other. Thus the opposed jaws may be made to grasp with exceeding great firmness a bar or cylindrical or other shaped piece placed between them, since they are moved by a powerful leverage. The inclined inner edges of the legs J slide upon and thus push the jaws together, while the sliding motion of these inclined surfaces is brought about by the screw motion, which is itself simply the application of the moving inclined plane to move the inclined plane of the edges. This is the gist of my invention, which I have designed to apply in various ways. Thus by operatively moving inclined surfaces to force the jaws forward by means of an inclined surface the desired result is attained.

The portions of the slide cut away at K K permit the slide C to be forced forwardly until the edge of the slot K engages the side of the slide C at the point where the flange E is bent away, thus giving a greater range or longer excursion to the slides L L.

Having thus described my invention, what I claim, and desire to secure by Letters Patent, is as follows:

1. In a chuck, the combination of jaws adapted to reciprocate toward each other, movable jaw-forcing parts having inclined surfaces, and a driving inclined surface adapted to move the said parts.

2. In a chuck, the combination of a two-legged slide, the opposed faces of said legs presenting inclined surfaces, with jaws adapted to be forced together by the motions of such inclined faces, and a screw to move the slide and thus operate the jaws.

3. In a chuck, the combination of a slide having legs with inclined opposed faces and adapted to move in a slot across the face of the chuck, with jaws adapted to move in slots on the face of such chuck at right angles to the line of motion of the slide, and said jaws removable and provided with faces, so as to be reversible, and also provided with slots having inclined faces to engage the faces of the legs on the slide, substantially as shown.

4. In a chuck, the combination of a slide having legs with inclined opposed faces and adapted to move in a slot across the face of the chuck, with jaws adapted to move in slots on the face of such chuck at right angles to the line of motion of the slide, and said jaws removable and provided with faces, so as to be reversible, and also provided with slots having inclined faces to engage the faces of the legs on the slide, and a screw mounted on the chuck and adapted to engage the screw-threads with which the slide is provided and thus to reciprocate the same.

FREDERICK N. GARDNER.

Witnesses:
CHAS. KENDALL,
DENNIS F. WARD.